United States Patent
Felder et al.

[11] 3,910,989
[45] Oct. 7, 1975

[54] N-TRIIODOBENZYL-CARBAMIC ACID DERIVATIVES

[75] Inventors: Ernst Felder; Davide Pitre, both of Milan, Italy

[73] Assignee: Bracco Industria Chimica, Societa per Azioni, Milan, Italy

[22] Filed: June 24, 1974

[21] Appl. No.: 482,665

[30] Foreign Application Priority Data
July 17, 1973 Switzerland.................. 10450/73

[52] U.S. Cl.................. 260/471 C; 424/5; 260/211
[51] Int. Cl.²...................................... C07C 125/06
[58] Field of Search ................... 260/471 C

[56] References Cited
UNITED STATES PATENTS
3,723,502  3/1973  Pifferi .......................... 260/471 C Primary Examiner—Robert Gerstl
Assistant Examiner—L. A. Thaxton
Attorney, Agent, or Firm—Hans Berman; Kurt Kelman

[57] ABSTRACT

Water-soluble salts of pharmaceutically acceptable bases with N-(2,4,6-triiodo-3-acylamino-5-carboxybenzyl)-carbamic acid esters of the formula

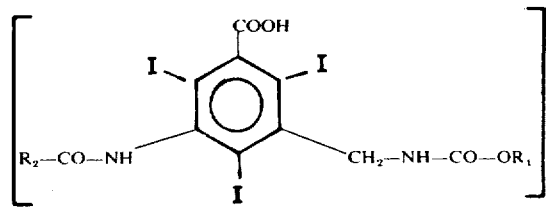

are relatively non-toxic, quickly excreted X-ray contrast agents suitable for intravenous administration. The carboxylic acids of the formula are monoesters of alcohols $R_1OH$ having up to four carbon atoms which are alkanols, mono- and dihydroxyalkanols, or alkoxyalkanols, when $n$ is 1, and diesters of alcohols $HO-R_1-R_1OH$ having up to 10 carbon atoms which are alkanediols or ethyleneglycol ethers when $n$ is 2. $R_2$ has up to three carbon atoms and is alkyl, hydroxyalkyl, or alkoxyalkyl.

9 Claims, No Drawings

N-TRIIODOBENZYL-CARBAMIC ACID DERIVATIVES

This invention relates to X-ray contrast agents, and particularly to radiopaque derivatives of triiodobenzoic acid capable of intravenous administration in aqueous solution, to the synthesis of such contrast agents, and to the use of compositions containing the same.

Such derivatives include the known X-ray contrast agents most effective and least toxic when used for vasography, urography, and cholecystography. Yet, the known compounds are not always tolerated well enough, nor do they provide images of adequate contrast under difficult conditions, and the search for improvement continues.

It has now been found that derivatives of 2,4,6-triiodo-5-acylbenzoic acid carrying a side chain $R_1$—O—CO—NH—CH$_2$— in position 3 offer significant advantages over the present state of this art. The injectable contrast agents of this invention are water-soluble salts of pharmaceutically acceptable bases with N-(2,4,6-triiodo-3-acylamino-5-carboxy-benzyl)-carbamic acid monoesters and diesters of the formula

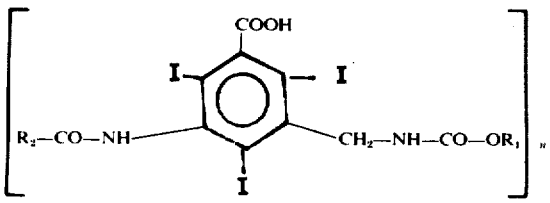

wherein $n$ is 1 or 2, $R_1$ has up to four carbon atoms and is alkyl, hydroxyalkyl, or alkoxyalkyl when $n$ is 1, and $R_1$ is one half of divalent alkylene or of oxaalkylene having 2 to 10 carbon atoms and up to four oxygen atoms when $n$ is 2, while $R_2$ has up to three carbon atoms and is alkyl, hydroxyalkyl, or alkoxyalkyl.

Injectable X-rays contrast agents must withstand thermal sterilization in aqueous solution, and it was surprising to find that the amide bond in the carbamate side chains in the contrast agents of this invention resists hydrolysis more strongly than a simultaneously present ester linkage or some ether linkages, as will become evident hereinafter. Aqueous solutions of the contrast agents may be safely subjected to sterilization at high temperature.

Many esters of the invention which are free carboxylic acids are insoluble or only sparingly soluble in water. They are useful primarily as intermediates in the preparation of the salts. The physiologically tolerated alkali and alkaline earth metal salts and many amine salts are sufficiently soluble in water so that injectable solutions containing 45 to 500 mg iodine per milliliter can readily be prepared. The preferred metal salts are the sodium salts. Lithium salts may be employed under some conditions, and the magnesium and calcium salts may be used jointly with the alkali metal or amine salts in smaller amounts. The amines which may constitute the base moiety in the salts are those commonly used in galenic pharmacy in salts with physiologically active acids and include N-methylglucamine, N-methylxylamine (1-methylamino-1-desoxy-[D]-xylite), 1-methylamino-2,3-propanediol, diethanolamine, monoethanolamine, tris-(hydroxymethyl)-aminomethane, and many others. The pharmaceutically acceptable bases are in themselves irrelevant to the action of the compounds as X-ray contrast agents for visualizing body cavities into which the compounds are introduced.

The salts of monoesters in which $R_1$ is alkyl, monohydroxyalkyl, dihydroxyalkyl, or alkoxyalkyl are eminently suitable for vasography and urography. Some are better tolerated then the best contrast agents now available for the same purpose. They are preferentially excreted by the kidneys at high concentration so as to provide good opacity for urography without remaining in the body for an extended period, whereby side effects are minimized.

The diesters of the invention are predominantly excreted by the liver and concentrate in the bile. Only a small portion is quickly excreted by the kidney. The remainder produces dense and well differentiated X-ray images of the gall bladder and also good images of the bile ducts. The diesters are better tolerated than the commonly used, intravenously administered contrast agents for cholecystography. Their toxicity is as low as that of the best-tolerated contrast agents for urography and vasography available heretofore. Some of the diesters of the invention may be employed for vasography, and their solutions have lower osmotic pressures than those of the monoesters of the invention at equal iodine concentration.

Table 1 lists relevant properties of N-methylglucamine salts of nine monoesters of the invention together with those of well-known X-ray contrast agents preferred heretofore by many radiologists for intravenous urography.

The carboxylic acids in the tested salts and the Examples in which the preparation of the compounds of the invention is described hereinbelow are identified in Table 1 by numbers as follows:

1: N-(2,4,6-triiodo-3-acetylamino-5-carboxy-benzyl)-carbamic acid methyl ester (Example 1)
2: N-(2,4,6-triiodo-3-propionylamino-5-carboxy-benzyl)-carbamic acid methyl ester (Example 2)
3: N-(2,4,6-triiodo-3-hydroxyacetylamino-5-carboxy-benzyl)-carbamic acid methyl ester (Example 4)
4: N-(2,4,6-triiodo-3-hydroxyacetylamino-5-carboxy-benzyl)-carbamic acid ethyl ester (Example 8)
5: N-(2,4,6-triiodo-3-methoxyacetylamino-5-carboxy-benzyl)-carbamic acid ethyl ester (Example 9)
6: N-(2,4,6-triiodo-3-acetylamino-5-carboxy-benzyl)-carbamic acid β-hydroxyethyl ester (Example 11)
7: N-(2,4,6-triiodo-3-hydroxyacetylamino-5-carboxy-benzyl)-carbamic acid β-hydroxyethyl ester (Example 13)
8: N-(2,4,6-triiodo-3-acetylamino-5-carboxy-benzyl)-carbamic acid β-methoxyethyl ester (Example 17)
9: N-(2,4,6-triiodo-3-methoxyacetylamino-5-carboxy-benzyl)-carbamic acid β-methoxyethyl ester (Example 18)
10: 3,5-Bis-(acetylamino)-2,4,6-triiodobenzoic acid (AMIDOTRIZOATE)
11: 3-Acetylaminomethyl-5-acetylamino-2,4,6-triiodobenzoic acid (IODAMIDE)
12: 5-Acetylamino-2,4,6-triiodo-N-methylisophthalamic acid (IOTALAMIC ACID)

The toxicities listed were determined as $LD_{50}$ in male white mice after intravenous injection of aqueous solutions and are expressed in mg iodine per kg body weight. Excretion with the bile and with urine were determined after intravenous injection in anesthetized rabbits carrying catheters in their ureters and bile ducts. Iodine in the secreted liquids was determined by an automatic analyzer, and the percentage of injected contrast agent excreted within three hours after the injection was caluclated from the analytical data.

Identical standard methods were employed in all tests whose results appear in the several appended Tables so that these results are directly comparable.

As is evident from Table I, the contrast agents of the invention, Nos. 1 to 9, compare favorably with the three known contrast agents Nos. 10 to 12, in their toxicities, in their specific excretion by the kidney, and in the rapidity with which they are discharged from the body. Compounds 1, 3, 4, and 8 and distinctly superior to the well-tolerated known compounds.

Table II shows toxicity and excretion data analogous to those of Table I for seven diesters of the invention and for three known contrast agents for cholecystography. The tested compounds were N-methylglucamine salts of carboxylic acids identified by capital letters as follows:

A: Di-N-(2,4,6-triiodo-3-acetylamino-5-carboxybenzyl)-carbamic acid ethyleneglycol ester (Example 19)

B: Di-N-(2,4,6-triiodo-3-acetylamino-5-carboxybenzyl)-carbamic acid 1,3-propanediol ester (Example 20)

C: Di-N-(2,4,6-triiodo-3-acetylamino-5-carboxybenzyl)-carbamic acid 1,4-butanediol ester (Example 21)

D: Di-N-(2,4,6-triiodo-3-acetylamino-5-carboxybenzyl)-carbamic acid 1,6-hexanediol ester (Example 22)

E: DI-N-(2,4,6-triiodo-3-acetylamino-5-carboxybenzyl)-carbamic acid diethyleneglycol ester (Example 23)

F: Di-N-(2,4,6-triiodo-3-acetylamino-5-carboxybenzyl)-carbamic acid triethyleneglycol ester (Example 24)

G: Di-N-(2,4,6-triiodo-3-hydroxyacetylamino-5-carboxy-benzyl)-carbamic acid ethyleneglycol ester (Example 25)

H: Adipinoyl-bis-(3-carboxy-2,4,6-triiodoanilide) (ADIPIODONE, U.S. Pat. No. 2,776,241)

I: Diglycoloyl-bis-(3-carboxy-2,4,6-triiodo-anilide) (IOGLACAMIC ACID, U.S. PAT. No. 2,776,241)

K: 4,7,10,13-Tetraoxahexadecane-1,16-dioyl-bis-(3-carboxy-2,4,6-triiodanilide) (IODOXAMIC ACID, U.S. Pat. No. 3,654,272).

Table III shows the results of cholecystographic and cholangiographic examination of dogs (1) and cats (2) 0.5, 1, 2, 4, 6, and 8 and hours after intravenous injection of N-methylglucamine salts of the carboxylic acids A - K at a dosage of 100 mg acid per kg body weight. The cholecystographic data are expressed as Hoppe Index values (J. O. Hoppe, J.Am. pharm. Assn., Sci. Ed., 48 [1959] 368–379). On Hoppe's scale, contrast of an X-ray image is evaluated as follows:

0 none
1 weak
2 adequate
3 good
4 excellent

The results of cholangiography simultaneous with the cholecystography are averages arrived at in a manner analogous to HOppe's method and based on the following scale:

0 bile ducts not visualized
1 cystic duct visible
2 common bile duct visible
3 hepatic duct visible
4 intrahepatic bile duct visible As is evident from Table II, the lethal dose $LD_{50}$ for the compounds of the invention is 2 to 5 times greater than that of compound H, the contrast agent most commonly used heretofore. The toxicity of compounds A, B, E, F, and G is substantially lower than that of the relatively well tolerated known contrast agents I and K. The diesters of the invention are more selectively excreted by the liver than the known materials. Even compound B, least effective among the compounds of the invention in this respect, is well above the average of the three known contrast agents.

All monoesters of the invention are excreted almost completely within three hours after the injection into the veins of standard laboratory test animals, thereby avoiding side effects whigh might be caused by extended retention of the contrast media in the body after urography or vasography.

The compounds of the invention are prepared from 3-aminomethyl-5-amino-2,4,6-triiodobenzoic acid or precursors thereof having the formula

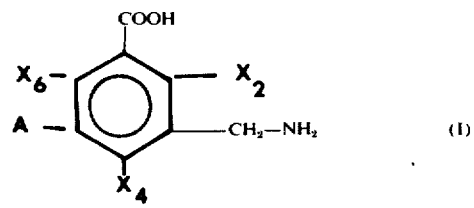

wherein A is amino or nitro, $X_2$, $X_4$, $X_6$ are iodine, chlorine, or hydrogen, by reaction steps whose sequence may be changed as desired. A triiodobenzoic acid derivative of formula (I) is reacted with a carboxylic acid ester of the formula $R_3$—O—CO—Y (II), wherein Y is halogen (preferably chlorine, but also bromine or iodine) or aryloxy, and $R_3$ has up to four carbon atoms and is alkyl, hydroxyalkyl, dihydroxyalkyl, alkyloxyalkyl; hydroxyalkyl or dihydroxyalkyl having at least one masked hydroxyl group, one half of divalent alkylene or oxaalkylene having up to ten carbons and up to four oxygen atoms, or with phosgene and an alcohol $R_3OH$. Hydroxyl groups may be masked by esterification, by formation of a readily split ether, or by an acetal or ketal. The resulting compound

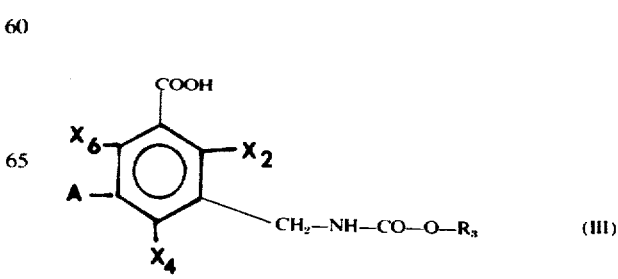

may require hydrogenation to convert A to amino if it was nitro, to convert $X_2$, $X_4$, $X_6$ to hydrogen if they where chlorine initially, and it may require conversion of $X_2$, $X_4$, $X_6$ to iodine if they were hydrogen before. The resulting carbamic acid ester is of the formula (III) in which A is amine and $X_2$, $X_4$, $X_6$ are iodine. It is then reacted with an acid of the formula $R_4COOH$ (IV) in the presence of a dehydrating agent, or with an anhydride or chloride of the last-mentioned acid in which $R_4$ is lower alkyl, hydroxyalkyl masked by ester or ether formation, or alkoxyalkyl.

The compound (II) may thus be an ester of a carbonic acid halide (chloroformate) or a mixed carbonic acid ester having one aliphatic alcohol moiety and an aryloxy group such as phenoxy, tolyloxy or nitrophenoxy.

The preferred starting material is 3-aminomethyl-5-amino-2-4-6-triiodobenzoic acid which is preferably reacted with an ester of chloroformic acid to an N-(2,4,6-triiodo-3-amino-5-carboxy-benzyl)-carbamic acid ester or urethane, whereupon the 3-amino group is acylated so that the desired N-(2,4,6-triiodo-3-acylamino-5-carboxy-benzyl)-carbamic acid may be recovered. Masking groups employed to protect hydroxyl groups in the acyl radical or in the alcohol moiety of the urethane may be split off during recovery, as by gentle heating in an alkaline medium.

The diesters of dihydric alcohols according to the invention are obtained in an analogous manner from 3-aminomethyl-5-amino-2,4,6-triiodobenzoic acid by reaction with chloroformates of the formula Cl—CO—O—Z—O—CO—Cl wherein Z has 2 to 10 carbon atoms and is alkylene or oxaalkylene having up to four oxygen atoms, and subsequent acylation of the reaction product.

Instead of 3-aminomethyl-5-amino-2,4,6-triiodobenzoic acid, precursors may be employed as starting materials if they contain an aminomethyl group attached to a benzene nucleus in meta-position to a carboxyl group. Such a precursor may be reacted with a chloroformate or analogous reactant to form an N-benzyl carbamic acid derivative which may then be further processed to the desired compound.

Preferred precursors include 3-amino-5-aminomethyl-benzoic acid, 3-nitro-5-aminomethyl-benzoic acid, and the mono or dihalogen derivatives thereof having halogen in positions 2, 4, and/or 6 of the benzene ring (Helv. Chim. Acta 48 [1964] 259–274). The product of reaction of the precursor with the chloroformate or its equivalent may then require hydrogenation to convert the nitro group to amino, and to replace halogen by hydrogen. The hydrogen formed or originally present in positions 2, 4, 6 of the benzene ring is then replaced by iodine in a conventional manner, as by reaction with iodine chloride or an alkali metal iododichloride.

The reaction between 3-amino-5-aminomethyl-2,4,6-triiodobenzoic acid or its precursors and the chloroformate is carried out preferably in an aqueous medium or in a water-miscible organic solvent at a temperature between approximately 0°C and approximately 40°C.

To avoid undesired side reactions involving hydroxyl groups in the reactants, such hydroxyl groups are preferably masked by esterification or formation of readily split ethers. If two adjacent hydroxyl groups are present in the same reactant, they may be protected reversibly by masking with an acetal or ketal group.

Suitable masking acid moieties for ester formation include the aliphatic acyloxy groups having up to four carbon atoms, and halogen (chlorine, bromine, iodine), and ethers may be formed with oxygen-linked benzyl, diphenylmethyl, triphenylmethyl (trityl), or trimethysilyl groups. Acetals may be derived from formaldehyde, acetaldehyde, or benzaldehyde, while acetone may furnish a ketal group.

The masking groups are readily removed during recovery of the desired product after acylation of the 3-amino group by gentle heating in an alkaline aqueous medium, by acid hydrolysis, or by transesterification. Removal of the masking groups normally does not involve a reaction step not otherwise required during recovery.

Compounds of the invention which are alkoxyalkylesters of a carbamic acid derivative, or which include an alkoxyacylamino group directly attached to the benzene nucleus, may be formed by reaction of an alcoholate with the corresponding haloalkylester or the corresponding haloacylamino group.

The compositions of the invention which may make a body cavity opaque to X-rays when administered, preferably by intravenous injection in a sufficient concentration, may consist essentially of a physiologically tolerated liquid carrier, and a compound of the formula

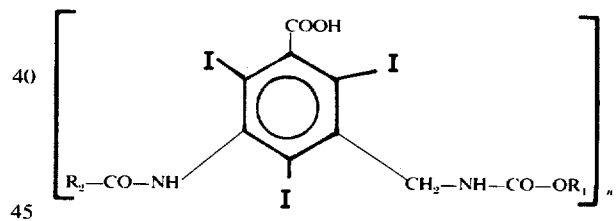

wherein $R_1$ and $R_2$ may be combined, by way of example, if $n$ is 1, in the following manner:

$R_1 = CH_3$     $R_2 = CH_3$, $CH_2CH_3$, $CH_2OH$, $CH_2—O—CH_3$;
$R_1 = CH_2CH_3$     $R_2 = CH_3$, $CH_2CH_3$, $CH_2OH$, $CH_2—O—CH_3$
$R_1 = CH_2CH_2OH$     $R_2 = CH_3$, $CH_2CH_3$
$R_1 = CH=(CH_2OH)_2$     $R_2 = CH_3$
$R_1 = CH_2CH(OH)CH_2OH$     $R_2 = CH_3$
$R_1 = CH_2CH_2—O—CH_3$     $R_2 = CH_3$, $CH_2OH$, $CH_2—O—CH_3$

If $n$ is 2, $R_1$ may be one half of the radicals listed below in combination with the groups represented by $R_2$ and indicated on the same line:

2 $R_1 = CH_2CH_2$     $R_2 = CH_3$
2 $R_1 = CH_2CH_2CH_2$     $R_2 = CH_3$
2 $R_1 = CH_2CH_2CH_2CH_2$     $R_2 = CH_3$
2 $R_1 = (CH_2)_n$     $R_2 = CH_3$
2 $R_1 = CH_2CH_2—O—CH_2CH_2$     $R_2 = CH_3$, $C_2H_5$, $CH_2OH$, $CH_2—O—CH_3$
2 $R_1 = (CH_2CH_2O)_2CH_2CH_2$     $R_2 = CH_3$, $CH_2OH$, $CH_2—O—CH_3$
2 $R_1 = (CH_2CH_2O)_3CH_2CH_2$     $R_2 = CH_3$, $CH_2OH$, $CH_2—O—CH_3$
2 $R_1 = (CH_2CH_2O)_4CH_2CH_2$     $R_2 = CH_3$, $CH_2OH$, $CH_2—O—CH_3$

The following Examples are further illustrative of the compounds of the invention, of their preparation, and of their use.

EXAMPLE 1

N-(2,4,6-Triiodo-3-acetylamino-5-carboxy-benzyl)-carbamic acid methyl ester (Compound No. 1)

100 g 3-Aminomethyl-5-amino-2,4,6-triiodobenzoic acid (0.184 mole) (Helv. Chim.Acta 48 [1965] 259) was suspended in 750 ml water, and 184 ml 1-N aqueous sodium hydroxide was added to produce a clear solution. To this solution, there were added simultaneously and drop by drop a solution of 18.5 ml methyl chloroformate (0.24 mole) in 50 ml acetone and 1-N aqueous sodium hydroxide (184 ml) over a period of somewhat more than 1 hour at such a rate as to keep the pH of the agitated solution between 10.5 and 11.

The reaction mixture was then filtered to remove a small amount of insoluble material, and the filtrate was stirred into dilute hydrochloric acid. Crude N-(2,4,6-triiodo-3-amino-5-carboxy-benzyl)-carbamic acid methyl ester precipitated and was filtered off with suction, washed with water, and dissolved in a small amount of water with sodium bicarbonate. The sodium salt of the acid was crystallized from the solution by the addition of concentrated sodium chloride solution. It was filtered off and dissolved in water, and the purified acid was precipitated from the aqueous solution with dilute hydrochloric acid and recovered in an amount of 89.5 g (81.3% yield). It melted at 121°–122°C and was identified by its equivalent weight of 601 (calculated: 601.9) and elementary analysis:

| | | |
|---|---|---|
| Calculated for $C_{10}H_9I_3N_2O_4$: | 19.95% C, | 63.25% I |
| Found: | 19.74 | 63.80 |

An $R_f$ value of 0.50 was found in a thin layer chromatogram using a butanol/acetic acid/water system 3:1:2. The same solvent mixture was employed in all reported TLC tests unless stated otherwise.

A mixture of 18 g N-(2,4,6-triiodo-3-amino-5-carboxyl-benzyl)-carbamic acid methyl ester (0.03 mole), 40 ml glacial acetic acid, 10 ml acetic anhydride, and 0.1 ml sulfuric acid was heated on a steam bath for four hours, and then allowed to stand at ambient temperature overnight. The precipitate formed from the initial solution was filtered off with suction, washed with water, and purified by dissolution in sodium hydroxide solution and reprecipitation with hydrochloric acid.

Compound No. 1 was obtained in an amount of 16.9 g (87% yield), melted at 175°–180°C, and gave an $R_f$ value of 0.48. It was identified by its equivalent weight of 642 (calculated: 643.94) and by elementary analysis:

| | | |
|---|---|---|
| Calculated for $C_{12}H_{11}I_3N_2O_5$: | 22.38% C; | 59.12% I |
| Found: | 22.06 | 59.57 |

The free carboxylic acid is only sparingly soluble in water, methanol, and chloroform, but readily soluble in hot ethanol. It absorbs moisture from the air to form a monohydrate. The sodium and N-methylglucamine salts are freely soluble in water.

EXAMPLE 2

N-(2,4,6-Triiodo-3-propionylamino-5-carboxy-benzyl)-carbamic acid methyl ester (Compound No. 2)

22.5 g N-(2,4,6-Triiodo-3-amino-5-carboxy-benzyl)-carbamic acid methyl ester (0.0374 mole) prepared according to Example 1, 45 ml propionic anhydride, and 3–4 drops concentrated sulfuric acid were stirred on a steam bath for about 4 hours. The excess of propionic anhydride was evaporated in a vacuum, and the residue was extracted with water and thereafter dissolved in dilute hydroxide solution. The solution was kept at 50°C and pH 10–10.5 for about 30 minutes. Compound No. 2 was precipitated from the solution with dilute hydrochloric acid and purified by way of the ammonium salt.

Pure Compound No. 2 was obtained in an amount of 22 g (90% yield), melted at 166°–167°C, and gave an $R_f$ value of 0.5. It was identified by elementary analysis:

| | | |
|---|---|---|
| Calculated for $C_{13}H_{13}I_3N_2O_5$: | 23.73% C; | 57.86% I |
| Found: | 23.73 | 57.98 |

The free carboxylic acid is insoluble in water, benzene, chloroform, and ethyl acetate, readily soluble in methanol and ethanol. At 20°C, 100 ml water dissolves 50 g of the sodium salt and at least 100 g of the N-methylglucamine salt.

EXAMPLE 3

N-(2,4,6-Triiodo-3-butyrylamino-5-carboxy-benzyl)-carbamic acid methyl ester

This ester was prepared by the method of Example 2 by substituting an equimolecular amount of butyric anhydride for the propionic anhydride. It melted at 165°–166°C, gave an $R_f$ value of 0.53, and was identified by elementary analysis:

| | | |
|---|---|---|
| Calculated for $C_{14}H_{15}I_3N_2O_5$: | 25.02% C; | 56.65% I |
| Found: | 25.27 | 56.75 |

The free carboxylic acid is insoluble in water, benzene, and chloroform, but dissolves readily in methanol. The sodium and N-methylglucamine salts are water-soluble.

EXAMPLE 4

N-(2,4,6-Triiodo-3-hydroxyacetylamino-5-carboxy-benzyl)-carbamic acid methyl ester (Compound No. 3)

22.5 g N-(2,4,6-triiodo-3-amino-5-carboxy-benzyl)-carbamic acid methyl ester (0.037 mole) was dissolved in 90 ml dimethylacetamide, and 10.9 g acetylglycolic acid chloride (0.08 mole) was added dropwise at 0°C within about 20 minutes with stirring which was continued for 15 hours at room temperature. The reaction mixture was then stirred into 250 ml water. The precipitate formed thereby was suspended in 150 ml water, heated to 50°C, adjusted to pH 9.5 with 1-N sodium hydroxide additions as needed until the desired 3-hydroxyacetylamino side chain was formed. The reaction mixture was decolorized with charcoal and added dropwise to dilute hydrochloric acid, whereby Compound No. 3 was precipitated in an amount of 21.7 g (88.3% yield).

It had a melting point of 196°–199°C and an $R_f$ value of 0.405. It was identified by its equivalent weight of 661 (calculated: 659.94) and by elementary analysis:

| | | |
|---|---|---|
| Calculated for $C_{12}H_{11}I_3N_2O_6$: | 21.84% C; | 57.68% I |
| Found: | 21.67 | 57.65 |

The solubility of the free carboxylic acid at 25°C in water is 0.7%, in methanol 5%, and in ethanol 4%, and it is 8, 45, and 10% in the same solvents at the boiling point. Water at 25°C dissolves more than its weight of the sodium salt and 60% of the N-methylgucamine salt. The free acid was recrystallized successfully from water.

EXAMPLE 5

N-(2,4,6-Triiodo-3-methoxyacetylamino-5-carboxybenzyl)-carbamic acid methyl ester 24 g N-(2,4,6-Triiodo-3-amino-5-carboxy-benzyl)-carbamic acid methyl ester (0.04 mole) was dissolved in 60 ml dimethylformamide, and about 20 ml of the solvent was distilled off to remove any water present. In a separate flask, 9 g methoxyacetic acid (0.1 mole) was dissolved in 50 ml dimethylformamide, and 11.9 g thionyl chloride (0.1 mole) was added dropwise at 2°–3°C over 25 minutes. The two solutions were combined 30 minutes later, and the mixture was stirred at room temperature, while the gradual disappearance of the starting ester was monitored by TLC. After 15 hours, the reaction mixture was poured into 400 ml water, whereby 24.8 g of the desired product was precipitated (92% yield). It was purified by conversion to the cyclohexylammonium salt. It melted at 245°C and had an $R_f$ value of 0.46. It was identified by elementary analysis:

| | | |
|---|---|---|
| Calculated for $C_{13}H_{13}I_3N_2O_6$: | 23.16% C; | 56.48% I |
| Found: | 23.29 | 58.49 |

The sodium and N-methylglucamine salts dissolve readily in water at 20°C.

EXAMPLE 6

N-(2,4,6-Triiodo-3-acetylamino-5-carboxy-benzyl)-carbamic acid ethyl ester

A solution of 218 g 3-aminomethyl-5-amino-2,4,6-triiodobenzoic acid (0.4 mole) in 1500 ml water and 400 ml 1-N sodium hydroxide solution was mixed at room temperature with a solution of 43.2 g ethyl chloroformate (0.4 mole) in 150 ml acetone which was added dropwise together with 400 ml 1-N sodium hydroxide solution to keep the pH at 10–11. Thereafter, stirring was continued for about 1 hour, and the solution was adjusted to pH 7 and extracted with ethyl acetate and chloroform. Organic solvent was removed from the aqueous liquid in a vacuum, and the liquid was then poured into 1100 ml dilute hydrochloric acid. The crude N-(2,4,6-triiodo-3-amino-5-carboxy-benzyl)-carbamic acid ethyl ester so obtained was dissolved in 200 ml water and 40 ml 10-N sodium hydroxide. The sodium salt was salted out with NaCl as described in Example 1 and recovered in an amount of 201 g (83% yield). It decomposed at 225°C and gave an $R_f$ value of 0.60.

| | | |
|---|---|---|
| Calculated for: $C_{11}H_{11}I_3N_2O_4$ | 21.45% C; | 61.81% I |
| Found: | 21.32 | 61.70 |

The ester was converted to the desired 3-acetylamino derivative as described in Example 1, and the latter was recovered in a yield of 73%. It melted at 150°–155°C, and had an $R_f$ value of 0.54. It was identified by its equivalent weight of 655 (calculated: 657.96) and by elementary analysis:

| | | |
|---|---|---|
| Calculated for $C_{13}H_{13}I_3N_2O_5$: | 23.73% C; | 57.86% I |
| Found: | 23.52 | 57.65 |

It is only sparingly soluble in water and chloroform, readily soluble in methanol and ethanol. Water at 20°C dissolves more than its own weight of the sodium and N-methylglucamine salts.

EXAMPLE 7

N-(2,4,6-Triiodo-3-propionylamino-5-carboxy-benzyl)carbamic acid ethyl ester and the corresponding 3-butyrylamino derivative were prepared in a sequence of steps analogous to that of Example 2 for the first and of Example 3 for the second-named compound. The 3-propionylamino derivative was obtained in a yield of 90%, melted at 233°–235°C, had an $R_f$ value of 0.57, and was identified by elementary analysis:

| | | |
|---|---|---|
| Calculated for $C_{14}H_{15}I_3N_2O_5$: | 25.02% C; | 56.65% I |
| Found: | 24.90 | 56.62 |

It is only sparingly soluble in water and chloroform, but readily dissolves in methanol.

The 3-butyrylamino derivative was obtained in a yield of 73%, melted at 146°–147°C, and had an $R_f$ value of 0.66.

| | | |
|---|---|---|
| Calculated for $C_{15}H_{17}I_3N_2O_5$: | 26.86% C; | 55.50% I |
| Found: | 26.36 | 55.38 |

The acid is sparingly soluble in water and chloroform, readily soluble in methanol, and absorbs one mole of crystal water from moist air.

EXAMPLE 8

N-(2,4,6-Triiodo-3-hydroxyacetylamino-5-carboxybenzyl)-carbamic acid ethyl ester (Compound No. 4)

24.8 g N-(2,4,6-Triiodo-3-amino-5-carboxy-benzyl)-carbamic acid ethyl ester was dissolved in 50 ml dimethylacetamide, and 13.6 g acetylglycolic acid chloride (0.1 mole) was added. The mixture was stirred 18 hours at room temperature and then poured into 400 ml ice water with stirring. The crude acetyl derivative of Compound No. 4 was precipitated, filtered off with suction, washed with a little water, and dissolved in dilute sodium hydroxide solution. The solution was heated to 60°C and kept at pH 10 by addition of dilute sodium hydroxide solution until saponification was achieved as indicated by stabilization of the pH without further need of sodium hydroxide additions. Compound No. 4 was then precipitated by means of 18% hydrochloric acid and recovered in an amount of 25 g (93% yield). It melted at 140° to 145°C and gave an $R_f$ value of 0.48.

| Calculated for $C_{13}H_{13}I_3N_2O_6$: | 23.17% C; | 56.49% I |
|---|---|---|
| Found: | 22.99 | 56.00 |

The acid absorbs 1 mole crystal water from moist air, dissolves in boiling water, in methanol, and in ethanol, but is only slightly soluble in cold water and chloroform. The sodium and N-methylglucamine salts readily dissolve in water.

EXAMPLE 9

N-(2,4,6-Triiodo-3-methoxyacetylamino-5-carboxybenzyl)-carbamic acid ethyl ester (Compound No. 5)

9 g Methoxyacetic acid (0.1 mole) was dissolved in 50 ml dimethylformamide, and 11.9 g thionyl chloride (0.1 mole) was added dropwise with stirring and ice cooling over 15 minutes. Stirring thereafter was continued for about 1 hour at room temperature, whereupon 24.8 g N-(2,4,6-triiodo-3-amino-5-carboxy-benzyl)-carbamic acid ethyl ester (0.04 mole) was added. The reaction mixture was stirred vigorously for about 12 hours and then poured with stirring into 300 ml water. The precipitate formed thereby was filtered off with suction, washed with cold water, and purified by dissolution in dilute sodium hydroxide solution and precipitation with hydrochloric acid. Compound No. 5 was recovered in an amount of 21.2 g (76% yield), melted at 227°–228°C, and gave an $R_f$ value of 0.4.

| Calculated for $C_{14}H_{15}I_3N_2O_6$: | 24.44% C; | 55.34% I; | Eq.wt.688.0 |
|---|---|---|---|
| Found: | 24.26 | 55.54 | 685 |

The acid is poorly soluble in water and chloroform, but dissolves in boiling methanol or ethanol. The sodium and N-methylglucamine salts dissolve freely in cold water.

obtained in an amount of 19.2 g (85% yield). It melted at 162°–163°C.

| Calculated for $C_{12}H_{14}N_2O_6$: | 51.06% C; | 9.93% N |
|---|---|---|
| Found: | 51.31 | 9.96 |

A solution of 0.02 mole of the compound so obtained in 150 ml water and 20 ml 1-N sodium hydroxide solution was hydrogenated at room temperature in the presence of 0.5 g 10% palladium catalyst on active carbon. After the amount of hydrogen (1350 ml) necessary for hydrogenation of the $NO_2$-group had been absorbed, the catalyst was filtered off, and 1000 ml water was added to the filtrate together with enough dilute hydrochloric acid to make the pH 2. 70 ml 1-N Potassium iododichloride ($KICl_2$) solution then was added with stirring which was continued for 12 hours.

The precipitated, crude N-(2,4,6-triiodo-3-amino-5-carboxy-benzyl)-carbamic acid isopropyl ester was filtered off with suction and dissolved in 30 ml water and the necessary minimum amount of 20% sodium hydroxide solution. The sodium salt was then precipitated by means of saturated sodium chloride solution, filtered off at 0°C, washed with a little saturated sodium chloride solution, and dissolved in 200 ml water. The solution was decolorized with active carbon, and added dropwise to dilute hydrochloric acid to precipitate the purified ester in an amount of 8.7 g (69% yield). It melted at 209°–210°C.

| Calculated for $C_{12}H_{13}I_3N_2O_4$: | 22.88% C; | 60.44% I, | Eq.wt.629.99 |
|---|---|---|---|
| Found: | 23.03 | 59.65 | 632 |

The end product then was obtained by acetylation as in Example 1 in a yield of 62%. It melted at 238°–240°C. When recrystallized from ethanol, it changed its crystal form and melted at 195°C. An $R_f$ value of 0.18 was established on silica gel with a butyl acetate/glacial acetic acid/water solvent 5:1:1.

| Calculated for $C_{14}H_{15}I_3N_2O_5$: | 25.02% C; | 56.66% I; | eq.wt.672 |
|---|---|---|---|
| Found: | 24.66 | 56.72 | 671 |

EXAMPLE 10

N-(2,4,6-Triiodo-3-acetylamino-5-carboxy-benzyl)-carbamic acid isopropyl ester 17.1 g 3-Aminomethyl-5-nitrobenzoic acid (0.08 mole) was dissolved in 100 ml water, 50 ml ethanol, and 40 ml 2-N sodium hydroxide, and the solution was cooled with ice and kept at pH 10–11 by dropwise addition of 40 ml 2-N sodium hydroxide solution while a solution of 10 gisopropyl chloroformate (0.08 mole) in 40 ml acetone was added drop by drop. The reaction mixture was evaporated to a vacuum to 150 ml and acidified with hydrochloric acid. The precipitated, crude N-(3-nitro-5-carboxy-benzyl)-carbamic acid isopropyl ester was recrystallized from ethanol, and was The free carboxylic acid is insoluble in water, but soluble in boiling ethanol. Water at 20°C dissolves an equal weight of the sodium or N-methylglucamine salt.

EXAMPLE 11

N-(2,4,6-Triiodo-3-acetylamino-5-carboxy-benzyl)-carbamic acid β-hydroxyethyl ester (Compound No. 6)

21.5 g Benzyloxyethyl chloroformate (0.1 mole) and 100 ml 1-N sodium hydroxide solution were added dropwise and simultaneously with stirring to a solution of 54.3 g 3-aminomethyl-5-amino-2,4,6-triiodobenzoic acid (0.1 mole) in 100 ml water and 100 ml 1-N sodium hydroxide at 10° to 15°C at a rate to maintain a pH of 10 to 11. The reaction mixture then was adjusted to pH 7, extracted with chloroform and ethyl acetate, stripped of residual solvent in a vacuum, and stirred into dilute hydrochloric acid. The precipitate was purified by dissolution in dilute sodium hydroxide solution at a pH not exceeding 7, removal of undissolved material by filtering, and precipitation with dilute hydrochloric acid.

N-(2,4,6-triiodo-3-amino-5-carboxy-benzyl)-carbamic acid β-benzyloxyethyl ester was recovered in an amount of 54.75 g (76% yield) and melted at 141°C (decomp.) and gave an $R_f$ value of 0.85.

droxide solution while a pH of 10–11 was maintained. Thirty minutes later, enough hydrochloric acid was added to adjust the pH to 7. The acetone was evaporated in a vacuum, and the aqueous solution was filtered and added dropwise to very dilute hydrochloric acid. The precipitate formed was washed with water and dissolved in aqueous sodium bicarbonate solution. The resulting solution was filtered and mixed with 100 g sodium chloride to precipitate the sodium salt of N-(2,4,6-triiodo-3-amino-5-carboxy-benzyl)-carbamic

| Calculated for $C_{17}H_{17}I_3N_2O_5$: | 29.94% C; | 52.73% I, | eq.wt. 722.06 |
|---|---|---|---|
| Found: | 29.44 | 53.15 | 720 |

Acetylation under the conditions of Example 1 yielded the β-benzyloxyethyl ester analogous to Compound No. 6 which melted at 115°–117°C.

80.6 g N-(2,4,6-triodo-3-aminomethyl-5-carboxybenzyl)-carbamic acid β-benzyloxyethyl ester (0.12 mole), prepared as described above, was mixed with 170 ml glacial acetic acid and 25 ml acetic anhydride, the mixture was heated to 95°C, and 1.7 ml concentrated sulfuric acid was added with stirring. The resulting clear solution was kept about 3 hours at 95°C and then evaporated to dryness in a vacuum. The residue crystallized when ground with ethyl ether. It was dissolved in dilute sodium hydroxide solution and extracted with chloroform and ethyl acetate. The purified aqueous solution then was stripped of residual organic solvent in a vacuum and stirred into dilute hydrochloric acid, whereby 58.8 g of a mixture of N-(2,4,6-triiodo-3-acetylamino-5-carboxy-benzyl)carbamic acid β-hydroxyethyl ester ($R_f$ 0.36) and of the corresponding β-acetoxyethyl ester ($R_f$ 0.43) was formed.

The mixture was dissolved in 300 ml water and 90 ml 1-N sodium hyroxide solution, and the solution so obtained was kept at 50°C and further supplied with dilute sodium hydroxide solution until the pH remained constant. It was then filtered and acidified carefully. The initial amorphous precipitate was discarded. Upon addition of much more acid, Compound No. 6 crystallized. It was recovered in several successive runs in yields of 56% to 65%, sintered at 155°C, and decomposed at 174°C. $R_f$ = 0.36.

acid β-chloroethyl ester. The salt was filtered off with suction, washed with saturated sodium chloride solution, dissolved in water, and decomposed with hydrochloric acid. The precipitated free carboxylic acid weighed 137 g (84.5% yield), sintered at 139° C, and decomposed at 175°C.

| Calculated for $C_{11}H_{10}ClI_3N_2O_4$: | Equivalent weight | 650.37 |
|---|---|---|
| Found: | | 654 |

An $R_f$ value of 0.61 was established with chloroform/m-ethylethtylketone/glacial acetic acid 10:5:2.

21.5 g β-Chloroethyl ester, prepared as described in the preceding paragraph (0.033 mole), was dissolved in 45 ml water containing 8.5 g 85% potassium hydroxide (0.1 mole). The solution was stored overnight at 0°C and then added dropwise to dilute hydrochloric acid to precipitate to β-hydroxyethyl ester formed by saponification of the chloroethyl derivative. The crude product was largely dissolved in dilute sodium hydroxide, and the solution was adjusted to pH 6. A small amount of undissolved 3-aminomethyl-5-amino-2,4,6-triiodobenzoic acid was removed by filtration, and the filtrate was acidified to precipitate the purified carbamic acid ester.

18 g Purified ester was dissolved in 20 ml methanol, the solution was decolorized with active carbon, filtered, and mixed with a solution of 3 ml cyclohexylamine in 20 ml ethanol. The resulting precipitate of the

| Calculated for $C_{13}H_{13}I_3N_2O_6$: | 23.17% C; | 56.49% I; | eq.wt.673.97 |
|---|---|---|---|
| Found: | 23.00 | 56.11 | 679 |

Compound No. 6 is soluble in boiling water, readily soluble in methanol and ethanol, poorly soluble in chloroform. The sodium and N-methylglucamine salts dissolve easily in water at 20°C.

The excess of acetic anhydride in the acetylation reaction caused replacement of the β-benzyloxy-group by an acetyloxy-group which ultimately was hydrolyzed.

EXAMPLE 12

N-(2,4,6-Triiodo-3-propionylamino-5-carboxy-benzyl)-carbamic acid β-hydroxyethyl ester 35.8 g β-Chloroethyl chloroformate (0.25 mole) dissolved in 200 ml acetone and 250 ml 1-N sodium hydroxide solution were added to a solution of 128 g 3-aminomethyl-5-amino-2,4,6-triiodobenzoic acid (0.25 mole) in 1000 ml water and 250 ml 1-N sodium hycyclohexylammonium salt was filtered off with suction, washed with methanol, suspended in water, and dissolved by added 2-N sodium hydroxide solution. The cyclohexylamine so liberated was removed by extraction with ethyl acetate, and the pure β-hydroxyethyl ester was precipitated from the aqueous phase with acid, and recovered in an amount of 14.3 g (68% yield). It sintered at 125°C, decomposed at 174°C, gave an $R_f$ value of 0.40 with chloroform/methylethylketone/glacial acetic acid 10:5:2, and had an equivalent weight of 625 (631.93 calculated for $C_{11}H_{11}I_3N_2O_5$).

12.6 g (0.02 Mole) of the last-prepared ester was suspended in 25 ml propionic anhydride, a few drops concentrated sulfuric acid were added, and the mixture was held on a steam bath for 2 hours and thereafter left to stand overnight. A crystalline precipitate then was filtered off with suction and dissolved in dilute sodium hydroxide solution. The solution so obtained was kept at 50°C and sodium hydroxide solution was added dropwise to hold the pH at 11 until the pH value no longer tended to drop. The solution then was cooled, and 6.7 g N-(2,4,6-triiodo-3-propionylamino-5-carboxy-benzyl)-carbamic acid β-hydroxyethyl ester (49% yield) precipitated when the solution was added dropwise to a little dilute hydrochoric acid and was recovered. It sintered at 172°C, decomposed at 193°C, and gave an $R_f$ value of 0.09 with chloroform/methylethylketone/glacial acetic acid 10:5:2. An equivalent weight of 693 was found, whereas 688 was calculated for $C_{14}H_{15}I_3N_2O_6$.

The free acid dissolves only sparingly in water and chloroform, but readily in methanol and hot ethanol. More than equal weights of the sodium or N-methylglucamine salts dissolve in water at 20°C.

EXAMPLE 13

N-(2,4,6-Triiodo-3-hydroxyacetylamino-5-carboxy-benzyl)carbamic acid β-hydroxyethyl ester (Compound No. 7)

25.3 g (0.04 Mole) N-(2,4,6-triiodo-3-amino-5-carboxy-benzyl)-carbamic acid β-hydroxyethyl ester, prepared as in Example 12, was reacted in 50 ml dimethylacetamide at room temperature with 21.8 g (0.16 mole) acetoxyacetyl chloride, and the reaction mixture was worked up as described in Example 8. The product initially obtained was a tacky mass which was heated to about 80° to 95°C before being separated from the aqueous liquor, whereby it crystallized. The crude crystalline material (25 g) was dissolved in 75 ml anhydrous ethanol, and the solution was mixed with 4 ml morpholine, causing immediate precipitation of the morpholine salt of Compound No. 7. After 2 hours, the precipitate was filtered off with suction, dissolved in water, and decomposed by adding the solution drop by drop to dilute hydrochloric acid at 50°C. The suspension so obtained was further heated to 80°and filtered with suction. 23 g Compound No. 7 was obtained (83.5% yield). It decomposed at 186°C. An $R_f$ value of 0.48 was determined by TLC on silica gel with methylethylketone/glacial acetic acid/water/ethanol 20:3:3:3.

54.3 g 3-Aminomethyl-5-amino-2,4,6-triiodobenzoic acid (0.1 mole) was dissolved in 100 ml water and 100 ml 1-N sodium hydroxide solution. 150 Ml of a 16% solution of 1-benzyloxy-2-butyl chloroformate in acetone and 100 ml 1-N sodium hydroxide solution were added dropwise to the first-mentioned solution at 10° to 15°C with stirring at such a rate as to keep the pH of the mixture between 10 and 11.

The mixture was further processed as in Example 11 to produce N-(2,4,6-triiodo-3-amino-5-carboxy-benzyl)-carbamic acid α-ethyl-β-benzyloxyethyl ester in a yield of 65.5%. The ester sintered at about 60°C, melted at 81°C, and gave an $R_f$ value of 0.70.

| | | | |
|---|---|---|---|
| Calculated for $C_{20}H_{21}I_3N_2O_5$: | 32.02% C; | 50.67% I; | eq.wt.750.11 |
| Found: | 32.16 | 50.52 | 750 |

30 g α-ethyl-β-benzyloxyethyl ester was N-acylated with 200 ml glacial acetic acid, 16 ml acetic anhydride, and 2 ml concentrated sulfuric acid at 95°C as further described in Example 11 to produce 15 g N-(2,4,6-triiodo-3-acetylamino-5-carboxy-benzyl)-carbamic acid α-ethyl-β-hydroxyethyl ester (53.5% yield) sintering at 147°c, decomposing at 176°C, and giving an $R_f$ value of 0.39. After being suspended in boiling decomposed ethyl acetate, the compound sintered at 162°C and decomposed at 186°c.

| | | | |
|---|---|---|---|
| Calculated for $C_{13}H_{17}I_3N_2O_6$: | 25.66% C; | 54.23% I; | eq.wt.702.03 |
| Found: | 25.55 | 54.45 | 704 |

The free carboxylic acid is soluble in boiling water, and it dissolves readily in methanol and ethanol. The sodium and N-methylglucamine salts dissolve freely in cold water.

EXAMPLE 15

N-(2,4,6-Triiodo-3-acetylamino-5-carboxy-benzyl)-carbamic acid 1,3-dihydroxyisopropyl ester 83.2 g 1,3-Formalglycerol (5-hydroxy-1,3-dioxane) (0.8 mole) was added dropwise and with agitation to a solution of 99 g (1 mole) phosgene in 1000 ml ethyl ether at 0° ± 10°C. The temperature was then permitted to rise slowly to 20°C, and the mixture was ultimately refluxed for 2 hours. The solvent was evaporated at ambient pressure, and the residue was distilled in a vacuum to yield 95 g 1,3-formalglyceryl chloroformate boiling at 106°-108°C at 14 mm Hg (71.5% yield).

A solution of 33.3 g (0.2 mole) 1,3-formalglyceryl chloroformate in 100 ml acetone and 200 ml 1-N so-

| | | | |
|---|---|---|---|
| Calculated for $C_{13}H_{13}I_3N_2O_7$: | 22.63% C; | 55.18% I; | eq.wt.690 |
| Found: | 22.35 | 54.69 | | 685 |

Compound No. 7 dissolves little in water and chloroform, readily dissolves in ethanol, and even more readily in methanol. The sodium and N-methylglucamine salts are very soluble in water at 20°C.

EXAMPLE 14

N-(2,4,6-Triiodo-3-acetylamino-5-carboxy-benzyl)-carbamic acid α-ethyl-β-hydroxyethyl ester dium hydroxide solution were added slowly with stirring to a solution of 108.6 g 3-aminomethyl-5-amino-2,4,6-triiodobenzoic acid (0.2 mole) in 1000 ml water and 200 ml 1-N sodium hydroxide at room temperature at such a rate that the mixture maintained a pH of 10 to 11.

After some more stirring, the solution was extracted with ethyl acetate, and the aqueous phase was added dropwise to an excess of dilute hydrochloric acid. A precipitate of N-(2,4,6-triiodo-3-amino-5-carboxy-benzyl)-carbamic acid 1,3-formalglyceryl ester formed, was filtered off with suction, and dissolved in very dilute sodium hydroxide solution, care being taken that the pH of the solution never exceeded 7. The solution so obtained was purified with active carbon and added dropwise to dilute hydrochloric acid to precipitate the purified carboxylic acid in an amount of 117 g (87% yield). When recrystallized from absolute ethanol, the compound decomposed at 174°–183°c.

| Calculated for $C_{12}H_{13}I_3N_2O_6$: | 23.17% C; | 56.49% I |
|---|---|---|
| Found: | 23.46 | 54.68 |

23.7 g (0.035 mole) N-(2,4,6-triiodo-3-amino-5-carboxy-benzyl)-carbamic acid 1,3-formalglyceryl ester was acetylated as described in preceding Examples in 70 ml glacial acid with 70 ml acetic anhydride and 0.1 ml sulfuric acid. The reaction mixture was evaporated to dryness in a vacuum, and the residue was suspended in water. The suspension was adjusted to pH 11, and this pH was maintained for 15 minutes by adding sodium hydroxide solution as needed. The mixture thereafter was kept at 70° to 80°C for about 25 minutes, whereby an almost clear solution was formed. Residual solid matter was removed by filtering, and the filtrate was acidified to pH 2. A small amount of precipitate formed and was removed by again filtering. The filtrate so obtained was evaporated to dryness in a vacuum.

The residue was repeatedly extracted with methanol, the combined extracts were decolorized with active carbon and evaporated to dryness. The residue weighing 24 g melted at 94° to 100°C. It was dissolved in absolute ethanol, and 2.4 ml cyclohexylamine was added to the solution to precipitate the cyclohexylammonium salt of N-(2,4,6-triiodo-3-acetylamino-5-carboxy-benzyl)-carbamic acid 1,3-dihydroxyisopropyl ester which was recovered by filtration with suction, washed with a little ethanol, and dissolved in water. The solution was passed over a column of 200 ml Amberlite IR-120, a cation exchange resin in the H form, and the desired ester in the free carboxylic acid form was recovered from the eluate by vacuum evaporation to dryness in an amount of 14.5 g (59%). It melted at 106°C and gave an $R_f$ value of 0.40 in a thin layer chromatogram with a solvent system of ethyl acetate/ethanol/25% ammonium hydroxide solution 11:7:6. The acid is soluble in water, methanol, and ethanol.

| Calculated for $C_{14}H_{15}I_3N_2O_7$: | 23.89% C; | 54.08% I, | eq.wt.704.00 |
|---|---|---|---|
| Found: | 23.64 | 53.81 | 714 |

EXAMPLE 16

N-(2,4,6-Triiodo-3-acetylamino-5-carboxy-benzyl)-carbamic acid 2,3-dihydroxypropyl ester 54.3 g 3-Aminomethyl-5-amino-2,4,6-triiodobenzoic acid (0.1 mole) was dissolved in 500 ml water and 100 ml 1-N sodium hydroxide solution. 19.5 g 1,2-Isopropylidene-glyceryl chloroformate in 100 ml acetone and 100 ml 1-N sodium hydroxide solution were added dropwise at 10° to 15°C at a rate to maintain a pH value of 10–11. The crude product formed was recovered in the manner described in Example 6 and dissolved in dilute sodium hydroxide solution which was adjusted to pH 11 and added dropwise to dilute hydrochloric acid 1 hour later to precipitate 47.25 g of the 2,3-dihydroxypropyl carbamate (71.5% yield). The acetone formed was lost during subsequent drying. The ester sintered at 125°C and decomposed at 187°C.

| Calculated for $C_{12}H_{13}I_3N_2O_6$: | 21.77% C; | 57.51% I |
|---|---|---|
| Found: | 22.21 | 56.36 |

36.4 g N-(2,4,6-Triiodo-3-amino-5-carboxy-benzyl)-carbamic acid 2,3-dihydroxypropyl ester (0.055 mole) in 260 ml glacial acetic acid and 28 g acetic anhydride (0.275 mole) were heated with stirring to 95°C, 10 drops concentrated sulfuric acid was added, and heating was continued for about 2 hours whereupon the mixture was evaporated to dryness in a vacuum. The residue crystallized when triturated with water. The crystals were filtered off with suction and dissolved in dilute sodium hydroxide solution. The solution was adjusted to pH 11, heated to 50°C, and kept at pH 11 by further addition of sodium hydroxide until the acetoxy groups were saponified. Upon acidification, the 2,3-dihydroxypropyl ester of N-(2,4,6-triiodo-3-acetylamino-5-carboxy-benzyl)-carbamic acid gradually crystallized. It was recrystallized from water and weighed 23.5 g (61% yield), sintered at 172°C, decomposed at 185°C, and gave an $R_f$ value of 0.29.

| Calculated for $C_{14}H_{15}I_3N_2O_7$: | 23.89% C; | 54.08% I; | eq.wt.704.00 |
|---|---|---|---|
| Found: | 23.28 | 53.44 | 700 |

The free carboxylic acid is poorly soluble in cold water and chloroform, soluble in cold ethanol, readily dissolves in boiling water, methanol, and boiling ethanol. The sodium and N-methylglucamine salts are freely soluble in cold water.

EXAMPLE 17

N-(2,4,6-Triiodo-3-acetylamino-5-carboxy-benzyl)-carbamic acid β-methoxyethyl ester (Compound No. 8)

Solutions of 163.2 g 3-Aminomethyl-5-amino-2,4,6-triiodobenzoic acid (0.3 mole) in 1000 ml water and 300 ml 1-N sodium hydroxide solution, of 41 g β-methoxyethyl chloroformate (0.3 mole) in 100 ml acetone, and of sodium hydroxide in water (300 ml 1-N) were combined at pH 10–11 as in the preceding Examples, and the carbamic acid ester formed thereby was recovered and purified in the manner more fully described above. It weighed 181 g (94% yield), melted at 182°C, and gave an $R_f$ value of 0.63.

| Calculated for $C_{12}H_{13}I_3N_2O_5$: | 22.31% C; | 58.94% I |
|---|---|---|
| Found: | 22.29 | 58.69 |

39 g N-(2,4,6-Triiodo-3-amino-5-carboxy-benzyl)-carbamic acid β-methoxyethyl ester was acetylated in 180 ml glacial acetic acid with 30 ml acetic anhydride and 0.1 ml concentrated sulfuric acid by stirring for 4 hours on a steam bath, and the crude Compound No. 8 obtained thereby was purified by conversion to the ammonium salt which was salted out of its concentrated aqueous solution by means of ammonium chloride in an amount of 29.2 g (70% yield), had a melting point of 130° to 135°C, and gave an $R_f$ value of 0.46.

| Calculated for $C_{14}H_{15}I_3N_2O_6$: | 24.44% C; | 55.34% I; | eq.wt.687.99 |
|---|---|---|---|
| Found: | 24.13 | 55.82 | 690 |

Compound No. 8 readily dissolves in boiling water, methanol, and ethanol. Its sodium and N-methylglucamine salts freely dissolve in cold water.

EXAMPLE 18

The use of propionic anhydride in the second stage of Example 17 produced the expected N-(2,4,6-triiodo-3-propylamino-5-carboxy-benzyl)carbamic acid β-methoxyethyl ester in a yield of 73%. After purification by being suspended in boiling ethyl acetate, it melted at 205° to 210°C, and gave an $R_f$ value of 0.56.

| Calculated for $C_{15}H_{17}I_3N_2O_6$: | 25.66% C; | 54.23% I; | eq.wt.702.03 |
|---|---|---|---|
| Found: | 25.88 | 54.03 | 704 |

The free carboxylic acid is sparingly soluble in water, soluble in ethanol, readily soluble in methanol.

Substitution of glycolic anhydride for the propionic anhydride in the procedure of the preceding paragraph produced N-(2,4,6-triiodo-3-hydroxyacetylamino-5carboxy-benzyl)carbamic acid β-methoxyethyl ester (Compound No. 13) in a yield of 91%. The compound melted at 206° to 208°C and gave an $R_f$ value of 0.49.

| Calculated for $C_{14}H_{15}I_3N_2O_7$: | 23.89% C; | 54.08% I; | eq.wt.703.99 |
|---|---|---|---|
| Found: | 23.78 | 53.81 | 707 |

The compound is soluble in boiling water and readily dissolves in methanol and ethanol. The sodium and N-methylglucamine salts freely dissolve in cold water.

With methoxyacetic anhydride, under otherwise unchanged conditions, N-(2,4,6-triiodo-3-methoxyacetylamino-5-carboxy-benzyl)-carbamic acid β-methoxyethyl ester (Compound No. 9) was obtained in a yield of 85%, melted at 193°–195°C, and gave an $R_f$ value of 0.57.

| Calculated for $C_{15}H_{17}I_3N_2O_7$: | 25.09% C; | 53.02% I; | eq.wt.718.02 |
|---|---|---|---|
| Found: | 24.84 | 52.37 | 718 |

The compound is sparingly soluble in water and chloroform, readily soluble in ethanol. The sodium and N-methylglucamine salts freely dissolve in cold water.

EXAMPLE 19

Di-N-(2,4,6-triiodo-3-acetylamino-benzyl)-carbamic acid ethyleneglycol ester (Compound A)

54.5 g 3-Aminomethyl-5-amino-2,4,6-triiodobenzoic acid was suspended in 80 ml dimethylacetamide, and 10.25 g ethyleneglycol dichloroformate (0.055 mole) was added dropwise with stirring. A clear solution was formed at once and was held at 70°C for about 4 hours. It was then evaporated in a vacuum to one half of its initial volume and stirred into 400 ml water, whereby di-N-(2,4,6-triiodo-3-amino-5-carboxy-benzyl)-carbamic acid ethyleneglycol ester was gradually precipitated in crystalline form. It was dissolved in aqueous ammonium bicarbonate solution, re-precipitated with hydrochloric acid, and further purified by suspension in hot isopropanol and dilute hydrochloric acid. It melted at 145°C and gave an $R_f$ value of 0.43.

| Calculated for $C_{20}H_{19}I_6N_4O_8$: | 19.99% C; | 63.36% I |
|---|---|---|
| Found: | 20.85 | 62.72 |

A suspension of 20 g of the diester in 80 ml glacial acetic acid was heated with stirring to 95°C with 2 ml acetic anhydride, and mixed with 0.1 ml concentrated sulfuric acid. Stirring was continued for 2 hours at 95°C, whereby initially a clear solution was formed, and crystalline Compound A later precipitated. It was purified by dissolution in ammonium bicarbonate solution and precipitation with hydrochloric acid, and further by being suspended in hot isopropanol, and by being filtered off with suction and washed with water.

The purified product weighed 14.4 g (67.5% yield), decomposed at 246°C, and gave an $R_f$ value of 0.39.

| Calculated for $C_{24}H_{20}I_6N_4O_{10}$: | 22.42% C; | 58.29% I |
|---|---|---|
| Found: | 21.73 | 57.57 |

Compound A is insoluble in water, methanol, ethanol, and chloroform. Water at 20°C dissolves at least an equal weight of the sodium and N-methylglucamine salts.

EXAMPLE 20

Di-N-(2,4,6-triiodo-3-acetylamino-5-carboxy-benzyl)-carbamic acid 1,3-propanediol ester (Compound B)

54.3 g 3-Aminomethyl-5-amino-2,4,6-triiodobenzoic acid and 11.05 g 1,3-propanediol dichloroformate were reacted as in Example 19, and the crude product was dissolved in dilute aqueous sodium hydroxide solution at pH not exceeding 7. Insoluble matter was filtered off, the filtrate was extracted four times with chloroform and three times with ethyl acetate, the extracts were discarded, and the aqueous phase was exposed to a vacuum to remove residual solvent. The aqueous liquid was acidified with hydrochloric acid to precipitate di-N-(2,4,6-triiodo-3-amino-5-carboxy-benzyl)-carbamic acid, 1,3-propanediol ester which was further suspended in boiling isopropanol, thereafter again dissolved in dilute sodium hydroxide, and precipitated with dilute hydrochloric acid. The purified product was recovered in an amount of 48.2 g (79.5% yield), sintered at 145°C, decomposed at 194°C, and gave an $R_f$ value of 0.67.

It was further reacted in an amount of 24.6 g with 8 ml acetic anhydride in 96 ml glacial acetic acid in the presence of 0.5 ml concentrated sulfuric acid as described in Example 19, and the crude Compound C so obtained was purified by dissolution in 15% ammonium hydroxide solution, precipitation by dropwise addition of the solution to dilute hydrochloric acid, second dissolution in little ammonium hydroxide solution, and salting out of the ammonium salt from the solution with ammonium chloride. The ammonium salt was dissolved in water, decomposed with dilute hydrochloric acid, and the free acid was again dissolved in sodium hydroxide gradually added to maintain a pH not higher than 7. Impurities were removed by filtration and carbon treatment of the filtrate, and the pure Compound C was ultimately precipitated with hydrochloric acid in an amount of 15.3 g (53% yield). It sintered at 178°C, decomposed at 212°C, and gave an $R_f$ value of 0.46.

| | | | |
|---|---|---|---|
| Calculated for $C_{21}H_{18}I_6N_4O_8$: | 20.75% C; | 62.63% I; | eq.wt.607.91 |
| Found: | 20.80 | 62.36 | 610 |

| | | | |
|---|---|---|---|
| Calculated for $C_{26}H_{24}I_6N_4O_{10}$: | 23.76% C; | 57.94% I; | eq.wt.656.96 |
| Found: | 23.43 | 58.06 | 648 |

The ester was acetylated as in Example 19, but did not require suspension in isopropanol for purification. Compound B was recovered in a yield of 82.5%, sintered at 190°C, decomposed at 210°C, and gave an $R_f$ value of 0.49.

| | | |
|---|---|---|
| Calculated for $C_{25}H_{22}I_6N_4O_{10}$: | 23.10% C; | 58.57% I |
| Found: | 22.85 | 58.65 |

Compound B dissolves poorly in water and chloroform, very readily in methanol and ethanol. Its sodium and N-methylglucamine salts dissolve in approximately equal weights of water at 20°C.

EXAMPLE 21

Di-N-(2,4,6-triiodo-3-acetylamino-5-carboxy-benzyl)-carbamic acid 1,4-butanediol ester (Compound C)

54.5 g 3-Aminomethyl-5-amino-2,4,6-triiodobenzoic acid and 11.8 g 1,4-butanediol dichloroformate were reacted as in Examples 19 and 20. The homologous product was recovered in an amount of 28.1 g (45.6% yield), melted at 235°C (decomp.), and gave an $R_f$ value of 0.39.

The acid is only sparingly soluble in water and chloroform, but readily dissolves in methanol and ethanol. The sodium and N-methylglucamine salts dissolve in water at 20°C in respective amounts of more than 100 g and approximately 50 g.

EXAMPLE 22

Di-N-(2,4,6-triiodo-3-acetylamino-5-carboxy-benzyl)-carbamic acid 1,6-hexanediol ester (Compound D)

The 3-amino analog of Compound D was prepared from 54.5 g 3-aminomethyl-5-amino-2,4,6-triiodobenzoic acid and 13.9 g 1,6-hexanediol dichloroformate as in Example 20 in an amount of 32 g (51% yield), decomposed at 234°C, and gave an $R_f$ value of 0.43.

| | | | |
|---|---|---|---|
| Calculated for $C_{24}H_{24}I_6N_4O_8$: | 22.92% C; | 60.54% I; | eq.wt.628.96 |
| Found: | 22.61 | 60.42 | 633 |

It was acetylated in an amount of 28.8 g in 112 ml glacial acetic acid with 9.2 ml acetic anhydride in the presence of 0.5 ml sulfuric acid, and Compound D was recovered in an amount of 21 g (68% yield), sintered at 170°C, decomposed at 220°–225°C, and gave an $R_f$ value of 0.47.

| | | | |
|---|---|---|---|
| Calculated for $C_{28}H_{28}I_6N_4O_{10}$: | 25.06% C; | 56.74% I; | eq.wt.670.99 |
| Found: | 25.23 | 56.71 | 672 |

Compound D is insoluble in water and chloroform, but easily soluble in methanol and ethanol. More than 100 g of the sodium and N-methylglucamine salts dissolves in water at 20°C.

EXAMPLE 23

Di-N-(2,4,6-triiodo-3-acetylamino-5-carboxy-benzyl)-carbamic acid diethyleneglycol ester (Compound E)

A solution of 0.1 mole 3-aminomethyl-5-amino-2,4,6-triiodobenzoic acid in 500 ml water and 100 ml 1-N sodium hydroxide solution was gradually mixed at 10°-15°C with 0.05 mole freshly distilled diethyleneglycol dichloroformate in 50 ml acetone and 100 ml 1-N sodium hydroxide solution in such a manner that the pH of the mixture was held between 10 and 11. Stirring was then continued for about 1 hour at room temperature, whereupon the mixture was adjusted to pH 7 and extracted with chloroform and ethyl acetate. Residual organic solvent was removed from the aqueous liquid in a vacuum, and the liquid was then acidified to precipitate 62.6 g di-N-(2,4,6-triiodo-3-amino-5-carboxy-benzyl)-carbamic acid diethyleneglycol ester (99% yield) which sintered at 135°C and decomposed at 191°C.

| | | |
|---|---|---|
| Calculated for $C_{22}H_{20}I_6N_4O_9$: | 21.21% C; | 61.12% I |
| Found: | 20.76 | 60.39 |

It was found to contain 1.9% water whereas 1.5 mole crystal water would amount to 2.2%. The equivalent weight calculated for 1.5 $H_2O$ is 636.24, while 635 was found.

The ester was acetylated as in the preceding Examples with a yield of 47 g (78.5%). Compound E sinters at 183°C, decomposes at 210°C. and gives an $R_f$ value of 0.48.

| | | | |
|---|---|---|---|
| Calculated for $C_{26}H_{24}I_6N_4O_{11}$: | 23.48% C; | 57.25% I; | eq.wt.664.96 |
| Found: | 23.20 | 57.10 | 660 |

Compound E is poorly soluble in water and chloroform, but dissolves very readily in methanol and ethanol. More than 100 g of the sodium and N-methylglutamine salts dissolves in 100 ml water at 20°C.

EXAMPLE 24

Di-N-(2,4,6-triiodo-3-acetylamino-5-carboxy-benzyl)-carbamic acid triethyleneglycol ester (Compound F)

120 g Triethyleneglycol (0.8 mole) were added dropwise at −10° to 0°C to a solution of 199.5 g phosgene (2 mole) in 1000 ml ethyl ether. The temperature then was raised stepwise for 30 minutes each to 0°, 10°, and 20°C, and ultimately for 2 hours to 35°C. The solvent was distilled off, and the residue was fractionated in a vacuum to produce 104 g triethlyleneglycol dichloroformate (47.5% yield), boiling at 160° to 161°c at 2 mm Hg.

54.3 g 3-Aminomethyl-5-amino-2,4,6-triiodobenzoic acid (0.1 mole) was reacted with 13.75 g (0.05 mole) triethyleneglycol dichloroformate as in Example 23 to produce the crude 3-amino analog of Compound F in an amount of 52.25 g (81% yield). When triturated with water, the crude material crystallized. it was dissolved in dilute sodium hydroxide solution, and the solution was added dropwise to an excess of dilute hydrochloric acid to precipitate 47 g of a purified intermediate sintering at 112°C, decomposing at 133°c, and giving an $R_f$ value of 0.63.

| | | |
|---|---|---|
| Calculated for $C_{24}H_{24}I_6N_4O_{10}$: | 22.35% C; | 59.03% I |
| Found: | 22.38 | 59.30 |

44 g Di-N-(2,4,6-triiodo-3-amino-5-carboxy-benzyl)-carbamic acid triethyleneglycol ester (0.034 mole) was acetylated in 190 ml glacial acetic acid with 13.6 ml acetic anhydride and 0.7 ml concentrated sulfuric acid. The crude Compound F was dissolved in dilute sodium hydroxide solution, reprecipitated with hydrochloric acid, and further purified by mixing a solution of the acid in ethanol with 5.5 ml cyclohexylamine, permitting the salt to crystallize overnight, and decomposing it in aqueous solution with hydrochloric acid. The pure compound was recovered in a yield of 31 g (65%), decomposed at 203°C, and gave an $R_f$ value of 0.46.

| | | | |
|---|---|---|---|
| Calculated for $C_{28}H_{28}I_6N_4O_{12}$: | 24.48% C; | 55.42% I; | eq.wt.686.99 |
| Found: | 24.58 | 54.55 | 697 |

It is only sparingly soluble in water and chloroform, but very soluble in methanol and ethanol. At least 100 g of the sodium and N-methylglucamine salts dissolves in 100 ml water at 20°C.

EXAMPLE 25

Di-N-(2,4,6-triiodo-3-hydroxyacetylamino-5-carboxy-benzyl)-carbamic acid ethyleneglycol ester (Compound G)

10 g Di-N-(2,4,6-triiodo-3-amino-5-carboxy-benzyl)-carbamic acid ethyleneglycol ester (0.008 mole) was prepared as in Example 19 and dissolved in 60 ml dimethylacetamide. The solvent was partly distilled off to mole) water, and 4.35 g (0.032 mole( acetoxyacetyl chloride was added dropwise at 2°-3°C. The reaction mixture was stirred 10 hours, and thereafter poured into 150 ml water. The mixture was adjusted to pH 11 by adding 35 ml 1-N sodium hydroxide solution, kept at 40°C for 1 hour, filtered, and stirred into 50 ml dilute hydrochloric acid, whereby Compound G was precipitated and could be recovered in an amount of 9 g (85% yield). It melted at 220°C (decomp.) and gave an $R_f$ value of 0.33.

| | | | |
|---|---|---|---|
| Calculated for $C_{24}H_{20}I_6N_4O_{12} \cdot 2H_2O$: | 21.29% C; | 56.23% I; | 2.66% $H_2O$ |
| Found: | 21.18 | 55.75 | 2.72 |

The sodium and N-methylglucamine salts are very soluble in water.

EXAMPLE 26

Di-N-(2,4,6-triiodo-3-methoxyacetylamino-5-carboxy-benzyl)-carbamic acid ethyleneglycol ester 12 g Di-N-(2,4,6-triiodo-3-amino-5-carboxy-benzyl)-carbamic acid ethyleneglycol ester was reacted with 2.7 g methoxyacetyl chloride in a manner otherwise analogous to the procedcure of Example 25. The desired compound was obtained in an amount of 13.1 g (97% yield), decomposed at 190°C, and gave an $R_f$ value of 0.42.

| Calculated for $C_{26}H_{21}I_6N_3O_{12}$: | 23.20% C; | 56.57% I |
|---|---|---|
| Found: | 22.94 | 56.85 |

The sodium and N-methylglucamine salts readily dissolve in water.

EXAMPLE 27

Di-N-(2,4,6-triiodo-3-hydroxyacetylamino-5-carboxy-benzyl)-carbamic acid diethyleneglycol ester 12.45 g Di-N-(2,4,6-triiodo-3-amino-5-carboxy-benzyl)-carbamic acid diethylaneglycol ester prepared as in Example 23 was reacted with 6.8 g acetoxyacetyl chloride in the manner of Example 25. The desired compound was obtained in an amount of 11.6 g (85.3% yield), melted at 213°–214°C, and gave an $R_f$ value of 0.27.

| Calculated for $C_{28}H_{23}I_6N_3O_{13}$: | 22.93% C; | 55.90% I; | eq.wt.681 |
|---|---|---|---|
| Found: | 22.54 | 55.22 | | 675 |

The sodium and N-methylglucamine salts dissolve very easily in water.

The following additional compounds were prepared in the manner evident from Examples 1 to 27:

N-(2,4,6-triiodo-3-α-hydroxy-propionylamino-5-carboxy-benzyl)-carbamic acid methyl ester, di-N-(2,4,6-triiodo-3-propionylamino-5-carboxy-benzyl)-carbamic acid diethyleneglycol ester, di-N-2,4,6-triiodo-3-methoxyacetylamino-5-carboxy-benzyl)- carbamic acid diethyleneglycol ester, di-N-(2,4,6-triiodo-3-α-hydroxypropionylamino-5-carboxy-benzyl)-carbamic acid diethyleneglycol ester, di-N-(2,4,6-triiodo-3-hydroxyacetylamino-5-carboxy-benzyl)-carbamic acid triethyleneglycol ester, di-N-(2,4,6-triiodo-3-α-hydroxypropionylamino-5-carboxy-benzyl)-carbamic acid triethyleneglycol ester, di-N-(2,4,6-triiodo-3-acetylamino-5-carboxy-benzyl)-carbamic acid tetraethyleneglycol ester, di-N-(2,4,6-triiodo-3-hydroxyacetylamino-5-carboxy-benzyl)-carbamic acid tetraethyleneglycol ester, di-N-(2,4,6-triiodo-3-acetylamino-5-carboxy-benzyl)-carbamic acid pentaethyleneglycol ester, and di-N-(2,4,6-triiodo-3-hydroxyacetylamino-5-carboxy-benzyl)-carbamic acid pentaethyleneglycol ester.

EXAMPLE 28

Solutions for intravenous administration prior to urography were prepared to the following typical compositions:

| | | |
|---|---|---|
| Compound No. 8, g | 542.5 | — |
| Compound No. 4, g | — | 602 |
| N-Methylglucamine, g | 134.4 | 97.6 |
| Sodium hydroxide, g | 4.0 | — |
| Monoethanolamine, g | — | 23.7 |
| Disodium EDTA | 0.1 | 0.1 |
| Bidistilled water to make ml | 1000 | 1000 |
| Iodine, mg/ml | 300 | 340 |

Disodium EDTA was dissolved first in a small portion of the water, and the radiopaque material, the N-methylglucamine, and the other base were added sequentially with stirring. The concentrated solution was adjusted to pH 7.1±0.2 and diluted to 1000 ml. The diluted solution was filtered and distributed in glass vials in batches of 10, 20, and 30 ml. The vials were sealed and sterilized for about 15 minutes at 110°C.

Other solutions for intravenous administration prior to urography prepared in an analogous manner from other monoesters of the invention had an iodine content of 150 mg/ml to 400 mg/ml.

EXAMPLE 29

Solutions for administration prior to and during vasography were prepared in the manner of Example 28 to the following typical compositions:

| | | | |
|---|---|---|---|
| Compound No. 3, g | 693.5 | — | — |
| Compound No. 13, g | — | 555 | — |
| Compound G, g | — | — | 890 |
| N-Methylglucamine, g | 78.1 | — | 85.5 |
| Methylxylamine, g | — | 47.7 | — |
| Sodium hydroxide, g | 24 | 10 | 17.54 |
| Tris-(hydroxymethyl)-aminomethane,g | 6.3 | — | — |
| 1-Methylamino-2,3-propanediol, g | — | 26.3 | 46.1 |
| Disodium EDTA, g | 0.1 | 0.1 | 0.2 |
| Bidistilled water, to make ml | 1000 | 1000 | 1250 |
| Iodine, mg/ml | 400 | 300 | 400 |

The cations present in solutions for vasography may be varied widely to suit specific requirements of angiocardiography, cerebral angiography, aortography, phlebeography, lymphography, hystero-salpingiography, splenoportography, etc., and the iodine content may be adjusted correspondingly to 150–500 mg/ml. Basically similar solutions, when administered by infusion, may contain 45 to 150 mg iodine per milliliter.

EXAMPLE 30

The solutions listed below have been used successfully in cholecystography and cholangiography:

| | | | | |
|---|---|---|---|---|
| Compound E, g | 524.3 | — | — | — |
| Compound C, g | — | 259 | — | — |
| Compound F, g | — | — | 271 | — |
| Compound B, g | — | — | — | 85.4 |
| N-Methylglucamine, g | 115 | 57.4 | — | 25.7 |
| N-Methylxylamine, g | — | — | 32.1 | — |
| Sodium hydroxide | 8.0 | 4.0 | 8.0 | — |
| Disodium EDTA, g | 0.1 | 0.1 | 0.1 | 0.05 |
| Bidistilled water to make ml | 1000 | 1000 | 1000 | 1000 |
| Iodine, mg/ml | 300 | 150 | 150 | 50 |

Solutions containing 150 to 400 mg iodine per milliliter are preferred for intravenous administration, and an iodine concentration of 45 to 150 mg/ml is generally chosen for application by infusion.

EXAMPLLE 31

To test the thermal stability of the compounds of this invention, aqueous solutions of the N-methylglucamine salts of the carbamic acid ester derivatives prepared in Examples 6, 10, 11, and 16 were subjected to a temperature of 120°C in sealed containers for 30 minutes and for 150 minutes, and the contents of each container were thereafter analyzed for hydrolysis of the CO—NH bond in the carbamate group.

No measurable hydrolysis was found in the ethyl carbamate group of the compound of Example 6 nor in the isopropyl carbamate group of the compound of Example 10 even after 150 minutes. 0.5% Hydrolysis was found after 30 minutes heating in the 62-hydroxyethyl carbamate group of Example 11, and 1% after 150 minutes at 120°C. The compound of Example 16 showed 0.7% hydrolysis in the 2,3-dihydroxypropyl carbamate group after 30 minutes and not more than 1.8% after 150 minutes.

By way of comparison, 10% hydrolysis within 30 minutes was found in the —NH—CO—CH$_2$CH$_2$ OH side chain of 2,4,6-triiodo-3-acetylaminomethyl-5-γ-hydroxypropionylamino-benzoic acid N-methylglucamine salt, and the same side chain was about 30% hydrolyzed after 150 minutes. The H$_2$N—CO—NH—Ch$_2$ side chain in 2,4,6-triiodo-3-ureidomethyl-5-acetylamino-benzoic acid N-methylglucamine salt was split 3 – 5 % after 30 minutes of heating, and 12–15% after 120 minutes. In the homologous methylureidomethyl group of 2,4,6-triiodo-3-methylureidomethyl-5-acetylamino-benzoic acid N-methylglucamine salt, 2% hydrolysis was noted after 30 minutes, and 10% after 150 minutes.

TABLE I

| Compound No. | Toxicity LD$_{50}$, mg I/kg | Excretion Bile | %, with Urine |
|---|---|---|---|
| 1 | 7800 | 4 | 88 |
| 2 | 6900 | 3 | 85 |
| 3 | 7700 | 5 | 93 |
| 4 | 7600 | 7 | 80 |
| 5 | 6900 | 4 | 83 |
| 6 | 7000 | — | — |
| 7 | 6900 | 11 | 74 |
| 8 | 7300 | | 97 |
| 9 | 7000 | 10 | 73 |
| 10 | 6800 | | 71 |
| 11 | 7050 | | 83 |
| 12 | 6300 | | 80 |

TABLE II

| Compound No. | Toxicity LD$_{50}$, mg I/kg | Excretion Bile | %, with Urine |
|---|---|---|---|
| A | 8100 | 56 | 19 |
| B | 7400 | 54 | 21 |
| C | 3950 | 66 | 12 |
| D | 3700 | 78 | 7 |
| E | 10500 | 60 | 13 |
| F | 10200 | 60 | 19 |
| G | 12270 | 76 | 13 |
| H | 2400 | 38 | 38 |
| I | 3750 | 30 | 41 |
| K | 4850 | 77 | 17 |

TABLE III

| Comp'd No. | Animal | Cholecystography, after | | | | | | Cholangiography, after | | | |
|---|---|---|---|---|---|---|---|---|---|---|---|
| | | 0.5 | 1 | 2 | 4 | 6 | 8 hrs | 0.5 | 1 | 2 | 4 hrs |
| A | 1 | 1 | 1 | 1 | 1 | 2 | 1.5 | 1 | 1 | 0 | 0 |
| | 2 | 0 | 0.5 | 0.5 | 2 | 2.5 | 2 | 0.5 | 1 | 1.5 | 1 |
| B | 1 | 2 | 2 | 3.3 | 3 | 3 | 2.5 | 3 | 3 | 4 | |
| | 2 | 1 | 1.5 | 2.5 | 2.8 | 2.8 | 2.8 | 3.3 | 3.3 | 2.5 | |
| C | 1 | 1.8 | 2 | 2.3 | 3 | 2.5 | 2.5 | 3 | 3.3 | 1 | 1 |
| | 2 | 1.3 | 2.3 | 2.3 | 3 | 2.5 | 2.5 | 2.8 | 2.5 | 2 | — |
| D | 1 | 0.8 | 1.5 | 2 | 2 | 1.8 | 1.8 | 2.3 | 1 | 0.5 | 0 |
| | 2 | 1 | 2.3 | 2.5 | 2.5 | 2.5 | 2.5 | 2.5 | 2.5 | 2.3 | 0 |
| E | 1 | 1.5 | 2.3 | 2.5 | 2.5 | 2.5 | 2.5 | 3 | 2.8 | | |
| | 2 | 1 | 1.8 | 2.3 | 2.8 | 2.5 | 2.5 | 3 | 3 | 3 | 2 |
| F | 2 | 0.5 | 1.5 | 2.3 | 2.5 | 2.8 | 2.5 | 1 | 2.8 | 4 | 4 |
| G | 2 | 0.25 | 1 | 2 | 2.5 | 2.8 | 2.8 | | 1 | 1.5 | 1.5 |
| H | 1 | 0.9 | 1.4 | 1.8 | 2.3 | 2 | | 2.3 | 1.8 | 0.5 | 0.9 |
| I | 1 | 0.8 | 1.3 | 1.7 | 1.8 | 1.9 | | 1.5 | 0.75 | 0.5 | 0.3 |
| | 2 | | | 0.5 | 0.7 | 1.2 | 2 | 2.5 | | | |
| K | 1 | 1.8 | 2.6 | 2.8 | 2.8 | 2.7 | | 2.4 | 2.2 | 0.8 | 0.8 |
| | 2 | | | 2 | 2 | 1 | | | | | |

What is claimed is:

1. A compound which is an N-(2,4,6-triiodo-3-acylamino-5-carboxy-benzyl)-carbamic acid ester of the formula

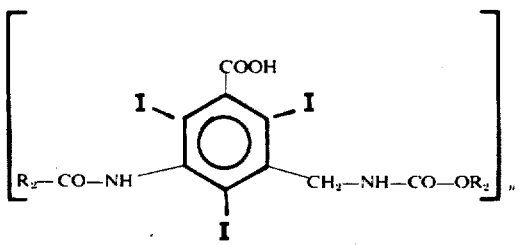

or a water-soluble salt of said ester with a pharmaceutically acceptable base, in said formula $n$ being 1 or 2, $R_1$ having up to four carbon atoms and being alkyl, hydroxyalkyl, or alkoxyalkyl when $n$ is 1, and said $R_1$ being divalent alkylene or oxaalkylene having one to five carbon atoms and up to two oxygen atoms when $n$ is 2, and $R_2$ having up to three carbon atoms and being alkyl, hydroxyalkyl, or alkoxyalkyl.

2. A compound as set forth in claim 1 which is a salt of said ester with a base selected from the group consisting of the hydroxides of sodium, lithium, calcium, and magnesium, and organic amines.

3. A compound as set forth in claim 1, wherein $n$ is 1.

4. A compound as set forth in claim 3, wherein $R_1$ is methyl, ethyl, 62-hydroxyethyl, 1,3-dihydroxyisopropyl, 1,3-dihydroxypropyl, 62-hydroxyethyl, or 62-methoxy-ethyl; and $R_2$ is methyl, ethyl, hydroxymethyl, or methoxymethyl when $R_1$ is methyl or ethyl, said $R_2$ being methyl or ethyl when $R_1$ is $\beta$-hydroxyethyl; said $R_2$ being methyl when said $R_1$ is dihydroxyisopropyl or dihydroxypropyl; and said $R_2$ being methyl, hydroxymethyl, or methoxymethyl when said $R_1$ is $\beta$-methoxymethyl.

5. A compound as set forth in claim 1, wherein $n$ is 2, and $R_1$ is divalent, straight-chained alkylene having up to three carbon atoms.

6. A compound as set forth in claim 5, wherein $R_2$ is methyl.

7. A compound as set forth in claim 1, wherein $n$ is 2, and $R_1$ is a divalent radical of the formula $-CH_2-CH_2-(O-CH_2-CH_2)_m-$ wherein $m$ is 1 or 2.

8. A compound as set forth in claim 7, wherein $R_2$ is methyl, ethyl, hydroxymethyl, or methoxymethyl.

9. A compound as set forth in claim 1, wherein said base is an alkanolamine.

* * * * *

UNITED STATES PATENT AND TRADEMARK OFFICE
CERTIFICATE OF CORRECTION

PATENT NO. : 3,910,989
DATED : October 7, 1975
INVENTOR(S) : Ernst Felder et al

It is certified that error appears in the above-identified patent and that said Letters Patent are hereby corrected as shown below:

In claim 1 (column 29), change the formula to read --

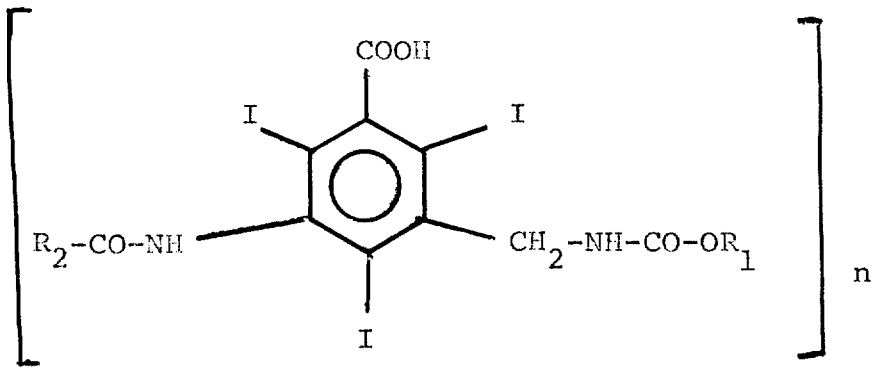

Signed and Sealed this thirtieth Day of December 1975

[SEAL]

Attest:

RUTH C. MASON
Attesting Officer

C. MARSHALL DANN
Commissioner of Patents and Trademarks